(No Model.)
C. E. CHINNOCK.
ELECTRICAL CIRCUIT.
No. 497,120. Patented May 9, 1893.
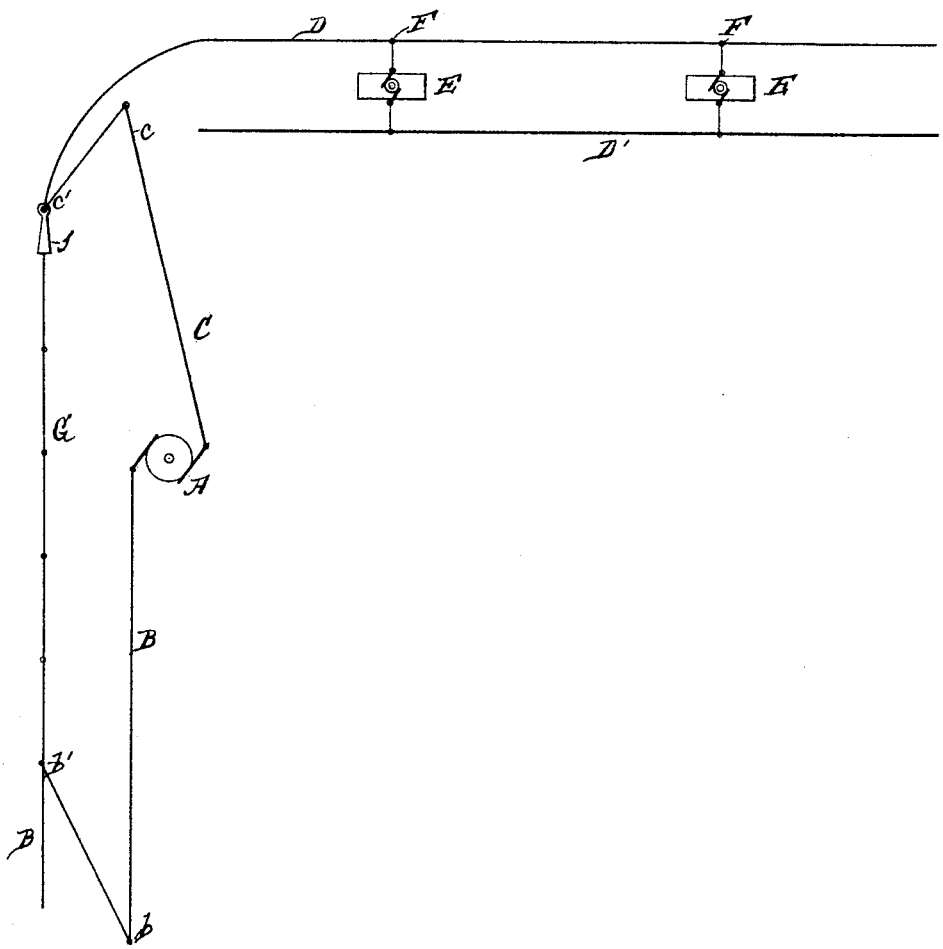
WITNESSES:
INVENTOR
Charles E. Chinnock
BY Edwin H. Brown
HIS ATTORNEY

UNITED STATES PATENT OFFICE.

CHARLES E. CHINNOCK, OF BROOKLYN, NEW YORK.

ELECTRICAL CIRCUIT.

SPECIFICATION forming part of Letters Patent No. 497,120, dated May 9, 1893.

Application filed December 17, 1891. Serial No. 415,335. (No model.)

*To all whom it may concern:*

Be it known that I, CHARLES E. CHINNOCK, of Brooklyn, county of Kings, and State of New York, have invented a certain new and useful Improvement in Electrical Circuits, of which the following is a specification.

This invention relates to electric circuits comprising a generator of electricity, and it consists in providing a shunt which will divert lightning from the electric generator, without offering any retardation through induction.

I will describe an electric circuit and appurtenances embodying my improvement, and then point out the novel features in a claim.

The drawing is a diagrammatic view illustrating my improvement.

I have shown the electric circuit as forming part of an electric car system, but I do not wish to be limited to the use of my improvement in connection therewith.

Referring by letter to the drawing, A designates an electric generator located in a station.

B shows a main conductor extending from one pole of the generator to the ground and C shows a main conductor extending from the opposite pole of the generator to a trolley wire D.

I have shown two motor cars E having trolleys F, connecting them with the wire D and having connection with a ground wire D', or an equivalent path to the ground.

The ground conductor B is, in this example of my invention, extended from the generator A, to a point $b$. Thence it takes a sharp turn back to a point $b'$ where it is deflected at a sharp angle and extended to the ground. The main conductor is shown as extending from the generator A to a point $c$. Thence it takes a sharp turn back to a point $c'$, where it is turned at a sharp angle and leads to the trolley wires D. A shunt G extends directly across from the conductor C to the conductor B. This shunt may be made of carbon, and of any number of sections, having sufficient resistance to prevent the flow across it of a material portion of the generated current, but conductivity enough to carry lightning traversing the conductor C, without fusing and thus divert it from the generator A.

One of the conductors B, C, may be disconnected from the shunt G when desired, by means of a switch $j$. I have here shown a switch connection between the shunt G and the conductor C at the point $c'$.

The shunt is to be of such character that lightning will not be retarded by self induction, hence it should not be volute or coiled.

Having described my invention, what I claim is—

In an electric circuit, the combination of a main circuit and a non-coiled shunt forming when closed a continuous circuit with the main circuit and constructed to have a higher resistance than the main circuit and so as to be capable of conducting lightning without retardation through induction, substantially as specified.

In testimony whereof I have signed my name to this specification in the presence of two subscribing witnesses.

CHARLES E. CHINNOCK.

Witnesses:
C. R. FURGUSON,
S. O. EDMONDS.